United States Patent
Tasser et al.

(10) Patent No.: US 7,752,219 B2
(45) Date of Patent: Jul. 6, 2010

(54) APPARATUS, SYSTEM, AND METHOD FOR CUSTOMIZED EVENT PROCESSING USING A JDBC RESOURCE ADAPTER

(75) Inventors: Ranjana Tasser, Fremont, CA (US); Shaji O. Vaidyan, Mumbai, IN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/842,678

(22) Filed: Aug. 21, 2007

(65) Prior Publication Data
US 2009/0055409 A1 Feb. 26, 2009

(51) Int. Cl.
G06F 7/00 (2006.01)
G06F 17/30 (2006.01)

(52) U.S. Cl. ...................... 707/765; 707/773

(58) Field of Classification Search .................. 707/1–5, 707/10, 999.001–999.005, 999
See application file for complete search history.

(56) References Cited

U.S. PATENT DOCUMENTS 7,003,730 B2  2/2006  Dettinger et al. ............ 715/764
7,051,032 B2  5/2006  Chu-Carroll et al. ........ 707/100
2007/0073672 A1* 3/2007  McVeigh et al. ............... 707/4

OTHER PUBLICATIONS

Yang, "Developing Integrated Web and Database Applications Using Java Applets and JDBC Drivers", p. 302-306.
Jordan, "Proceedings of the Second International Workshop on Persistence and Java", 177 pgs.

* cited by examiner

Primary Examiner—Mohammad Ali
Assistant Examiner—Kannan Shanmugasundaram
(74) Attorney, Agent, or Firm—Kunzler Needham Massey & Thorpe

(57) ABSTRACT

An apparatus, system, and method are disclosed for managing dynamically generated events in a database. An activation module receives a custom event query comprising a pool quantity from a user. An event query module executes the custom event query on a database. An event retrieve module receives a result set with a quantity of database events in response to the custom event query. An event object builder module creates an event object for each of the database events to be processed by a JDBC adapter. An event processing module executes an object function defined within each event object. An event update module modifies one or more records in the database such that the database events in the result set are not present in a subsequent result set for the custom event query.

3 Claims, 3 Drawing Sheets

APPARATUS, SYSTEM, AND METHOD FOR CUSTOMIZED EVENT PROCESSING USING A JDBC RESOURCE ADAPTER

BACKGROUND OF THE INVENTION

1. Field of the Invention

This invention relates to database systems and more particularly relates to event processing in database systems.

2. Description of the Related Art

Database event detection and processing is often inflexible and complicated for database users. To detect a database event, a user must set one or more triggers for updates on a database table. As the corresponding change occurs in the database table, a trigger records the change in an event table. Trigger based event detection creates an extra process that must execute for each event. This overhead can cause delay and latency during database operations, especially operations including multiple commands and events, as each event is detected and recorded in the event table. Some users may not want to use this intrusive approach for event detection, or may not have the proper access permissions to set triggers.

Database users may also require more flexibility in defining what constitutes an event. Trigger based event detection often cannot detect complicated or non-standard events, especially those involving multiple tables. Some users require the detection of custom events that are not supported by conventional trigger based event detection systems. Conventional resource adapters, for example Java Database Connectivity (JDBC) adapters, rely on trigger based event detection systems to detect events for processing. Conventional JDBC adapters poll the event tables, and therefore have the limitations and overhead of the trigger based systems.

SUMMARY OF THE INVENTION

From the foregoing discussion, it should be apparent that a need exists for an apparatus, system, and method that manage dynamically generated database events without using triggers or event tables. Beneficially, such an apparatus, system, and method would also be able to manage and detect custom or non-standard events, even across multiple tables.

The present invention has been developed in response to the present state of the art, and in particular, in response to the problems and needs in the art that have not yet been fully solved by currently available trigger and event table based event detection systems. Accordingly, the present invention has been developed to provide an apparatus, system, and method for dynamically generated database event management that overcome many or all of the above-discussed shortcomings in the art.

The apparatus to manage dynamically generated database events is provided with a plurality of modules configured to functionally execute the necessary steps of receiving a custom event query, executing the custom event query, receiving a result set, and populating event objects from the result set. These modules in the described embodiments include an activation module, an event query module, an event retrieve module, an event object builder module, an event processing module, and an event update module.

The activation module, in one embodiment, is configured to receive a custom event query from a user. The custom event query preferably comprises a poll quantity. In one embodiment, the custom event query may be a standard SQL query, a stored procedure, or a stored function.

The event query module is configured, in one embodiment, to execute the custom event query on a database or an enterprise information system. In a further embodiment, the event retrieve module may be configured to receive a result set in response to the custom event query. The result set may have a quantity of database events equal to the poll quantity. Each database event of the result set includes an event id field, an object key field, an object name field, and an object function field.

The event object builder, in one embodiment, is configured to create an event object for each database event. The event objects are configured to be processed by a JDBC adapter. The event processing module is configured, in one embodiment, to execute an object function defined within each event object. In a further embodiment, the event update module may modify one or more records in the database so that the database events in the result set are not present in a subsequent result set for the custom event query.

A system of the present invention is also presented to manage dynamically generated database events. The system may be embodied by an integration broker, an event configuration tool, and a JDBC adapter. In particular, the JDBC adapter, in one embodiment, includes the modules of the apparatus presented above. In one embodiment, the event configuration tool receives a custom update query from the user, and the event update module executes the custom update query on the database.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
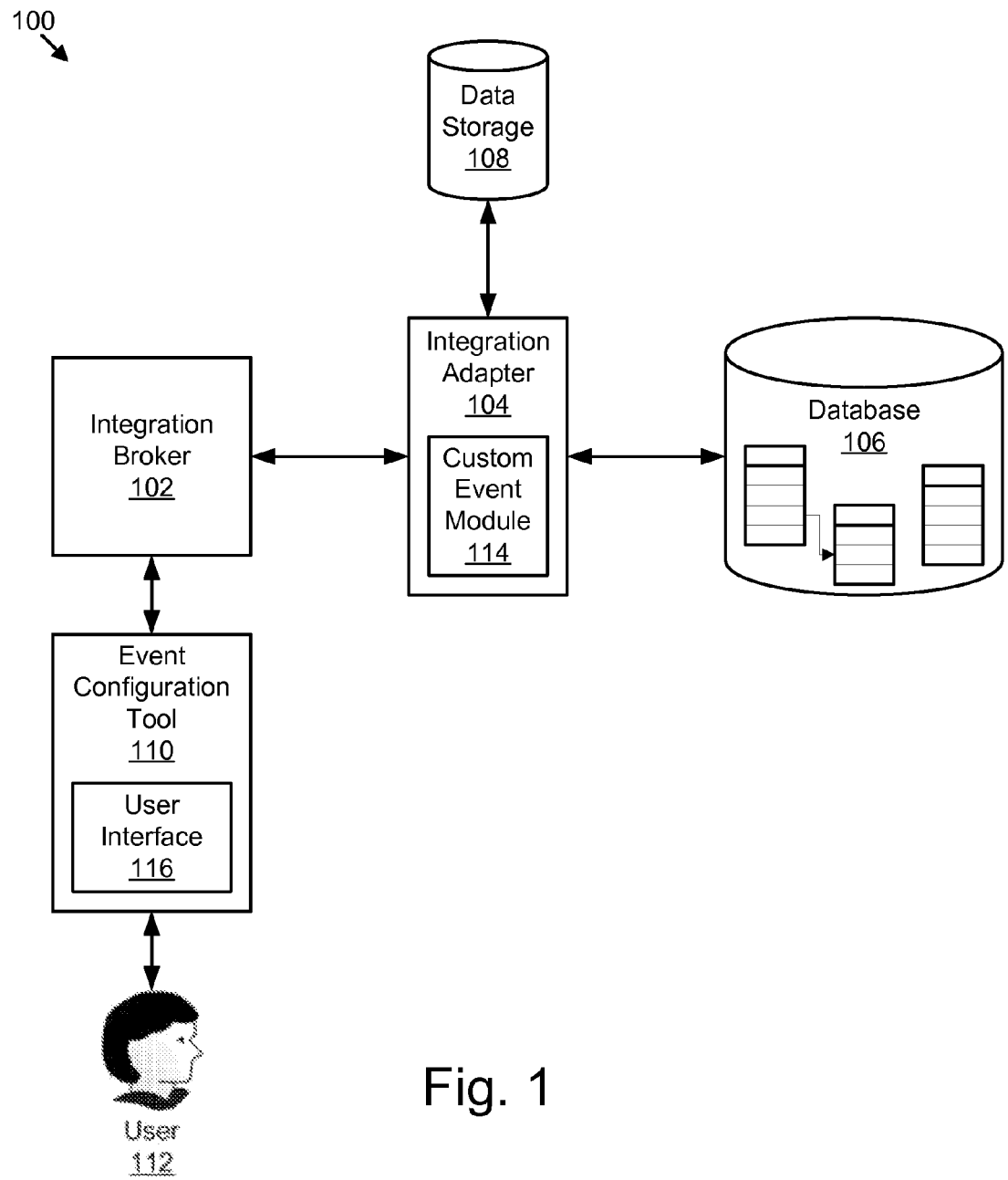
FIG. 1 is a schematic block diagram illustrating one embodiment of a database event management system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a database event management system 100. In one embodiment, the system 100 comprises an integration broker 102, an integration adapter 104, a database 106, data storage 108, an event configuration tool 110, and a user 112.

In one embodiment, the integration broker 102 is a module or system that acts as an intermediary between two or more applications. The integration broker 102 may integrate data among heterogeneous applications. In FIG. 1, the integration broker 102 may act as an intermediary between the integration adapter 104 and the event configuration tool 110, facilitating communication between them. The integration broker 102 may transform, coordinate, host, format, or otherwise broker data between the integration adapter 104 and the event configuration tool 110. The integration broker 102 may transform data between a format usable by the integration adapter 104 and a format usable by the event configuration tool 110. In one embodiment, the integration broker 102 is an IBM Websphere Process Server (WPS).

In one embodiment, the integration adapter 104 provides access to the database 106. The integration adapter 104 provides a common interface for other adapters, applications, modules, clients, or users to access data in the database 106. In one embodiment, the integration adapter 104 is a JDBC adapter. In one embodiment, the integration adapter 104 comprises a custom event module 114. One example of the custom event module 114 is described in greater detail with regard to FIG. 2. In general, the custom event module 114 is configured to detect database events by executing a custom event query on the database 106 that returns a result set comprising database events.

In one embodiment, the database 106 comprises a data storage application in communication with the integration adapter 104. The database 106 may comprise one or more database tables with rows and columns, or may comprise other data structures to store, organize, and track data. The database 106 may comprise an Enterprise Information System (EIS) as is generally known in the art, may be a component of an EIS, or may be an independent database application. The database 106 may comprise an EIS that supports third party access. In one embodiment the database 106 tracks and manages data relevant to an enterprise, and may include sales, production, finance, accounting, or human resources data. The database 106 could be Ariba, Clarify CRM, eMatrix, i2, IBM DB2, IBM IMS, JD Edwards OneWorld, MetaSolv Applications, Oracle Applications, PeopleSoft Enterprise, Portal Infranet, SAP, Siebel Business Applications, SunGuard FRONT ARENA, Sybase ASE, or another database system or EIS with an interface accessible to the integration adapter 104.

In one embodiment, the data storage 108 is coupled to the integration adapter 104. The data storage 108 may be a type of electronic, magnetic, or optical data repository, such as RAM, flash memory, a hard drive, or an optical disk. The integration adapter 104 may store or manipulate data in the data storage 108 such as event objects, user inputs, custom event queries, custom update queries, result sets, or other data. In one embodiment, the data storage 108 is configured for local or temporary data storage uses by the integration adapter 104 and the custom event module 114.

In one embodiment, the event configuration tool 110 is in communication with the integration broker 102, and the user 112. The event configuration tool 110 may comprise a user interface 116 configured to receive input from the user 112. The user 112 may be a database administrator (DBA), or another end user of the database 106 that requires dynamically generated custom events.

The user interface 116 may comprise a graphical user interface (GUI), a keyboard, a mouse, or other user interface devices. The event configuration tool 110 may receive a custom event query from the user 112 through the user interface 116. The custom event query preferably includes a polling quantity that specifies how many events should be processed each polling cycle. The event configuration tool 110 may also receive one or more custom update queries from the user 112 through the user interface 116.

In one embodiment, the event configuration tool 110 receives input from the user 112 to populate an activation specification for the integration adapter 104. In one embodiment, the activation specification is a JDBC adapter activation specification, and may have pre-defined properties for a custom event query, a custom update query, or other activation data for the integration adapter 114. The event configuration tool 110 may use a GUI with a series of editable fields, clickable buttons, selectable menus, check boxes, or other GUI tools to receive activation data from the user 112 and to populate the activation specification. One example GUI that the event configuration tool 110 may use to receive activation data from the user 112 is depicted in FIG. 3. The custom event query, the polling quantity, and the custom update query are discussed in greater detail with regard to FIG. 2.

Figure 2:
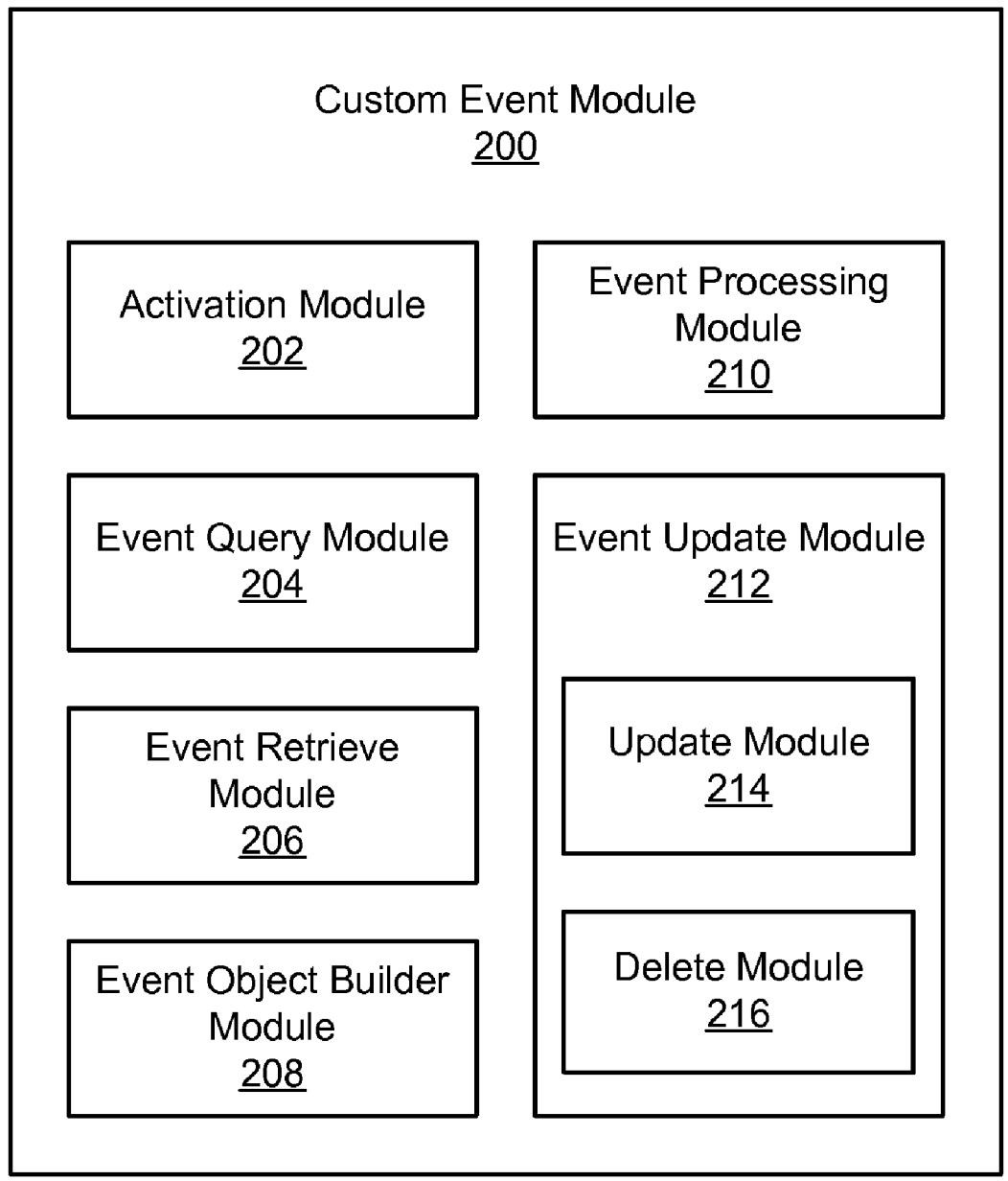
FIG. 2 is a schematic block diagram illustrating one embodiment of a custom event module in accordance with the present invention.
Figure 3:
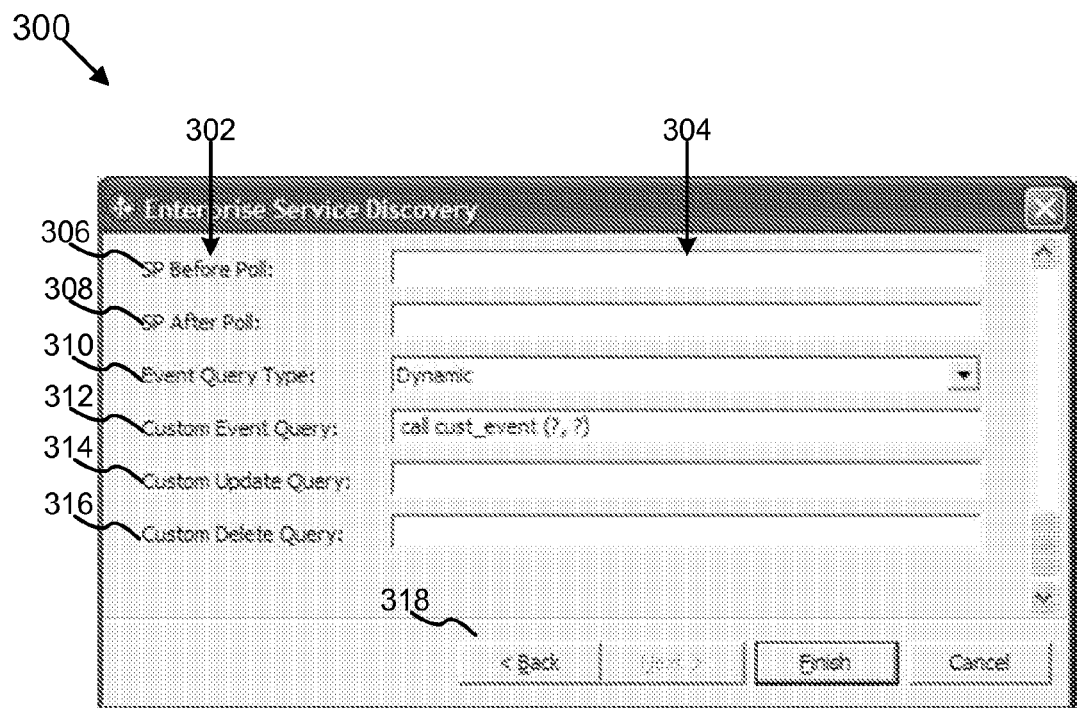
FIG. 3 is a screenshot diagram illustrating one embodiment of an event configuration GUI in accordance with the present invention.

FIG. 2 depicts a custom event module 200. The custom event module 200 may be substantially similar to the custom event module 114 of FIG. 1. The custom event module 200 may be part of an integration adapter 104, like the custom event module 114, or may be independent from an integration adapter 104, but in communication with the integration adapter 104. The custom event module 200 is in communication with a database. In one embodiment, the custom event module 200 comprises an activation module 202, an event query module 204, an event retrieve module 206, an event object builder module 208, an event processing module 210, and an event update module 212.

In one embodiment, the activation module 202 receives a custom event query from a user. The activation module 202 may be in communication with an event configuration tool that is substantially similar to the event configuration tool 110 of FIG. 1. The activation module 202 may communicate with the event configuration tool through an integration broker 102. Alternatively, the activation module 202 may comprise a user interface to receive input from a user without an integration broker 102.

In a further embodiment, the activation module 202 is configured to populate an activation specification for an integration adapter. The activation specification may be available to the integration adapter at runtime. The activation specification may be a JDBC adapter activation specification. In one embodiment, the activation module 202 may be configured to receive multiple custom event queries, each query associated with a different type of event. One example GUI that the activation module 202 may use to receive activation data is depicted in FIG. 3.

The custom event query may be a standard structured query language (SQL) query, a stored procedure, or a stored function. This allows a user to define customized or complicated events that are not possible using traditional trigger-defined event systems. The custom event query may also comprise a poll quantity, which is the number of events that will be processed in each poll cycle. The activation module 202 may receive the poll quantity from a user independent of the custom event query, or as a part of the custom event query.

The custom event query defines the events that the custom event module 200 will detect. The custom event query may comprise a join across multiple tables and may select fields from different tables to build up and define the event that needs to be processed. The custom event query may define the event using a variety of SQL queries, stored procedures, or stored functions as are generally known in the art that are configured to return a result set. In one embodiment, the result set comprises a set of rows that each represent a corresponding database event, as defined by the custom event query, equal in number to the poll quantity. In a further embodiment, the result set is a JDBC ResultSet, as is generally known in the art.

In a further embodiment, the records or database events in the result set each have an event id field, an object key field, an object name field, and an object function field. The values of these fields may be specified in the custom event query, or returned from the database. The fields or columns in the result set may also have a pre-specified order. The event id may be a unique identifier for each event. In one embodiment, the event id value is the same as the object key value, which is the key value of the record in the table which will be retrieved for event processing. The object name may be the name of the business graph generated using a discovery tool such as IBM's Enterprise Service Discovery (ESD) for WebSphere Adapters. In one embodiment, a business object within the business graph may be a hierarchical business object. Each business object may refer to a table or a view in the database. The object function is an operation to be set on the event. In one embodiment, the operation may be a create operation, an update operation, or a delete operation.

In one embodiment, the activation module 202 may store the custom event query in local storage, substantially similar to the data storage 108 of FIG. 1, or alternatively the activation module 202 may store a reference to a custom event query that is stored in a database, such as, for example, a stored procedure or a stored function.

In a further embodiment, the activation module 202 may receive one or more custom update queries from a user. Custom update queries are described in greater detail below with regard to the event update module 212. In general, custom event queries are configured to prevent events defined by the custom event query that have already been returned in a result set from being returned again in a subsequent result set.

In one embodiment, the event query module 204 executes the custom event query on the database. The event query module 204 may execute the custom event query each poll cycle. The poll cycle may be based on time, a time interval, the poll quantity, or on another schedule or signal. If the custom event query is a standard SQL query, the event query module 204 may use a standard SQL database interface that is available to the event query module 204 to execute the custom event query.

One example of a standard SQL custom event query is: "select customer_id event_id, customer_id object_key, 'AdministratorCustomerBG' object_name, 'Create' object_function fetch first 10 rows only;" In this example, the event id and the object key are both the same, and the key value of the record in the table that will be retrieved for event processing is customer_id. The object name in the example is AdministratorCustomerBG, which is the name of the business graph. The object function in the example is Create, and the poll quantity is 10. This example custom event query is configured to return a result set with specifically named columns in a specific order, and to return poll quantity number of events. With these columns in this specific order, the remainder of the event processing can proceed as if the events originated from an event table that held event records generated by database triggers, as in conventional event management systems.

If the custom event query is a stored procedure, the event query module 204 may be configured to call the stored procedure or stored function within the database. The event query module 204 may pass the poll quantity value as an argument to the stored procedure or stored function. In one embodiment, the stored procedure or stored function is also configured to return a result set. Example syntax for specifying a stored procedure is:

call <sp_name> (?, ?)

In the example, sp_name is the name of the stored procedure, and the question marks represent one input parameter and one output parameter. The syntax for calling a stored function may be slightly different, for example:

?=<sp_name>(?)

In the second example, sp_name is the name of the stored function. In this example, the output parameter is listed as the first question mark, and the input parameter is listed as the second. In one embodiment, the event query module 204 sets the input parameters and registers the output parameters before calling the stored procedure or stored function. Example code that the event query module 204 may use to do this is:

cs.setInt(1, pollQuantity);
cs.registerOutParameter(2, java.sql.Types.OTHER);

In the example, cs is a CallableStatement instance. The event query module 204 first sets the input parameter pollQuantity, and then registers the output parameter as the result set. The 1 and the 2 in the example above may be switched for a stored function, because of the differences in syntaxes between a stored procedure call and a stored function call.

In one embodiment, the event retrieve module 206 retrieves the result set in response to the custom event query. One example of code that the event retrieve module 206 may execute to retrieve the result set is:

ResultSet rs=(ResultSet) cs.getObject(2);

In the example, the event retrieve module 206 retrieves the result set, as previously registered, from the cs CallableStatement instance and assigns it to the ResultSet rs. For a stored function, the command may be cs.getObject(1), because of the differences in syntax. The stored procedure or stored function may also take additional input parameters that are defined by the user in the custom event query.

In one embodiment, the event object builder module 208 creates an event object for each of the database events or records that the event retrieve module 206 receives in the result set. In one embodiment, the event objects are JDBCEvent objects, and are configured to be processed by a JDBC adapter. In one embodiment, the event object builder module 208 populates each of the event objects with the fields or columns from the corresponding records in the result set. In a further embodiment, the event object builder module 208 stores the event objects in an array list or another data structure for the event processing module 212 or an integration adapter to process them.

In one embodiment, the event processing module 210 processes the event objects that the event object builder module 208 creates. The event processing module 210 may be configured for standard event processing, including either ordered or unordered delivery, as is generally known in the art. The event processing module 210 may use a single thread to process events, or multiple threads, depending on whether ordered or unordered delivery is used. In one embodiment, the event processing module 210 retrieves the data from the event objects. In a further embodiment, the data from the event objects comprises an event id, an object key, an object name, and an object function.

In one embodiment, the event processing module 210 creates a data object based on the object name and sets the object key on the data object. In a further embodiment, the event processing module 210 calls a retrieve command on the data object to populate the data object. This may include a deep retrieve of the top level data object if there are child objects. In one embodiment, the event processing module executes the object function defined within the event object. In a further embodiment, the object function is a create function, an update function, or a delete function.

In one embodiment, the event update module 212 modifies one or more records in the database so that events defined by the custom event query that have already been returned in a result set for processing are not returned in an additional result set for a subsequent poll cycle.

As described above in connection with the activation module 202, the activation module 202 may receive one or more custom update queries from a user. The custom update queries may be part of an activation specification for an integration adapter. In one embodiment, the custom update queries may be standard SQL queries, stored procedures, or stored functions as described above in connection with the custom event query. In a further embodiment, the custom update queries take an event id as an input parameter. The event update module 212 may provide the event id and execute the custom update queries on the database. The custom update queries may be update or delete queries. In one embodiment, the event update module 212 may comprise an update module 214 and a delete module 216.

Depending on the user's requirements, the user may specify an update query, a delete query, or both. The update module 214 may execute the update query after the event retrieve module 206 retrieves the result set and before the event query module 204 executes the custom event query in a following poll cycle. The update query may set an event processing status field in the record associated with an event id in a table in the database. The user may then incorporate the processing status field into a "where" clause in the custom event query to prevent the custom event query from returning events that have a predefined status value indicating that they have already been processed or are being processed.

For example, the event processing status field may be a simple binary flag, or may hold values similar to "in progress," "completed," "deleted," or the like. Alternatively, some users may require that records be deleted upon completion of event processing. If the user specifies a delete query, the delete module 216 may execute the delete query after the event processing module 210 has completed processing an event, or at another predetermined state in event processing when the record associated with the event id is no longer useful.

FIG. 3 depicts a screenshot diagram illustrating an event configuration GUI 300. The event configuration tool 110 or the activation module 202 may use the event configuration GUI 300 or a similar interface as a graphical tool to receive input from a user, like the user 112. In one embodiment, the event configuration GUI 300 comprises a group of specification field descriptions 302, and a group of specification fields 304.

In one embodiment, the specification field descriptions 302 label or describe to a user what data should be entered in each of the specification fields 304. the specification field descriptions 302 may comprise text, icons, diagrams and the like, and may provide further information in response to user interaction, such as a mouse click, a mouse hover, a keyboard selection, or the like. In one embodiment, the specification fields 304 may comprise text boxes, drop down menus, radio buttons, check boxes, and the like.

In one embodiment, the event configuration GUI 300 comprises specification a group of field descriptions 302 and a group of specification fields 304 comprising an SP Before Poll field 306, an SP After Poll field 308, an Event Query Type field 310, a Custom Event Query field 312, a Custom Update Query field 314, and a Custom Delete Query field 316. A user may use the SP Before Poll field 306 to specify a standard SQL query, stored procedure or stored function that the event query module 204 will execute before each poll cycle. A user may use the SP After Poll field 308 to specify a standard SQL query, stored procedure or stored function that the event query module 204 will execute after each poll cycle. The Event Query Type field 310 may specify a query type associated with the custom event query. For example, the Event Query Type field 310 may specify that the custom event query is a "Dynamic" query, or another query type that may be database or adapter specific. The Custom Event Query field 312 may specify a custom event query that is substantially similar to the custom event queries described above, for example a standard SQL query, a stored procedure, or a stored function. In the event configuration GUI 300, the Custom Event Query field 312 specifies the custom event query "call cust_event(?, ?)." In the example, cust_event is a stored procedure. An example cust_event stored procedure that the Custom Event Query field 312 might call in an adapter for an Oracle database is:

```
create or replace procedure cust_event (var0 IN NUMBER, p_cursor OUT types.ref_cursor)
   is
      begin
      open p_cursor for select pkey event_id, pkey object_key,
'CustomerBG' object_name, 'Create' object_function from CUSTOMER
where ROWNUM <= var0;
end;
```

The Custom Update Query field 314 may specify an update query that is substantially similar to the update queries described above. The Custom Delete Query field 316 may specify a delete query that is substantially similar to the delete queries described above. In one embodiment, the event configuration tool GUI 300 may also comprise a group of navigation buttons 318 that are configured to assist the user to navigate through the event configuration tool GUI 300. For example, the group of navigation buttons 318 may comprise a back button, a next button, a finish button, a cancel button, a help button and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to manage dynamically generated database events for processing by a Java Database Connectivity ("JDBC") adapter, the apparatus comprising:

an activation module configured to receive a custom event query, a custom update query, and a delete query from a user, the custom event query comprising a poll quantity, the custom event query defining a custom database event for a database, each result of the custom event query comprising a custom database event for processing by a JDBC adapter, the poll quantity specifying a number of custom database events to process during each polling cycle in a series of periodic polling cycles, each polling cycle comprising executing the custom event query and processing the number of custom database events specified by the poll quantity;

an event query module configured to execute the custom event query on the database each polling cycle;

an event retrieve module configured to receive a result set from the database in response to the execution of the custom event query by the event query module, the result set comprising a quantity of custom database events equal to the poll quantity, each custom database event comprising a result of the custom event query, each custom database event in the result set further comprising an event id field, an object key field, an object name field, and an object function field;

an event object builder module configured to create an individual event object data structure for each custom database event from the quantity of custom database events, each event object database structure configured to be processed by a JDBC adapter as a database event;

an event update module configured to modify one or more records in the database such that the database events in the result set are not present in a subsequent result set for the same custom event query executed by the event query module during a subsequent polling cycle, the event query module further configured to execute the custom update query on the database each polling cycle;

a delete module configured to execute the delete query on the database each polling cycle; and an event processing module configured to execute an object function defined within each event object for each event object.

2. The apparatus of claim 1, wherein the custom event query is selected from the group consisting of a standard SQL query, a stored procedure, and a stored function.

3. A system to manage dynamically generated database events, the system comprising:

an integration broker configured to facilitate communication between an event configuration tool and a Java Database Connectivity ("JDBC") adapter;

the event configuration tool in communication with the integration broker, the event configuration tool configured to receive a custom event query, a delete query, and a custom update query from a user, the custom event query comprising a poll quantity, the custom event query defining a custom database event for a database, each result of the custom event query comprising a custom database event for processing by the JDBC adapter, the poll quantity specifying a number of custom database events to process during each polling cycle in a series of periodic polling cycles, each polling cycle comprising executing the custom event query and processing the number of custom database events specified by the poll quantity;

the JDBC adapter in communication with the integration broker and the database;

the JDBC adapter further comprising, an event query module configured to execute the custom event query on the database each polling cycle;

an event retrieve module configured to receive a result set from the database in response to the execution of the custom event query by the event query module, the result set comprising a quantity of custom database events equal to the poll quantity, each custom database event comprising a result of the custom event query, each custom database event in the result set further comprising an event id field, an object key field, an object name field, and an object function field;

an event object builder module configured to create an individual event object data structure for each custom database event from the quantity of custom database events, each event object data structure configured to be processed by the JDBC adapter as a database event;

an event update module configured to modify one or more records in the database such that the database events in the result set are not present in a subsequent result set for the same custom event query executed by the event query module during a subsequent polling cycle, the event update module further configured to execute the custom update query on the database each polling cycle;

a delete module configured to execute the delete query on the database each polling cycle; and an event processing module configured to execute an object function defined within each event object for each event object.

* * * * *